Jan. 10, 1939. A. BURMEISTER 2,143,138

METHOD AND APPARATUS FOR GENERATING FOAM

Filed April 26, 1926

Inventor
Hans Burmeister
By Knight ...
attys

Patented Jan. 10, 1939

2,143,138

UNITED STATES PATENT OFFICE 2,143,138

METHOD AND APPARATUS FOR GENERATING FOAM

Hans Burmeister, Berlin, Germany, assignor, by direct and mesne assignments, to Pyrene-Minimax Corporation, a corporation of Delaware Application April 26, 1926, Serial No. 104,750
In Germany May 8, 1925

3 Claims. (Cl. 169—15)

My invention relates to a method of producing foam generating liquids or an extinguisher foam itself.

It is known to pass water under pressure through chemicals stored in the dry or moist state with the object of producing foam generating or developing liquids. The water under pressure either dissolves a portion of the chemicals and is led away as unsaturated or saturated solution, or it washes away solid undissolved chemicals in addition to the dissolved. When the solutions react, a gas such as carbon dioxide is liberated, which is preserved by a foam stabilizing agent added to one of the chemicals.

The disadvantages of methods heretofore employed may be summed up as follows:

1. The foam developed is hardly ever neutral. Also, the chemicals are not properly utilized and the quality of the foam suffers thereby, especially when there is an excess of acid.

2. The apparatus and the entire plant operates under pressure and does not permit replenishment of the chemicals during service.

3. After such apparatus or plants have once been placed in service, the chemicals either have to be consumed completely, or the unused portions thereof have to be removed from the apparatus before it is again ready for use, because these portions tend to become lumpy and crystallize due to the moisture therein.

4. After the apparatus has been in operation, it must be carefully cleaned and dried if it is to be maintained in readiness for use over a considerable period of time.

5. The choice of the chemicals employed is limited, sometimes requiring chemicals which produce inferior foam.

6. The regulation of the foam production in regard to its viscosity offers great difficulties.

The disadvantages above specified for such apparatus and plants are effectively overcome by this invention. In contrast with the apparatus mentioned, no water under pressure is forced through the chemicals in order to dissolve them in accordance with my invention, but the chemicals are dissolved or added to the water in definite quantities during the operation of the apparatus. The mixture thus produced is then conducted to the place where it is to be applied.

The accompanying drawing illustrates diagrammatically a suitable apparatus for carrying out the improved method and its manner of operation will be easily understood from the following description.

Figure 1:
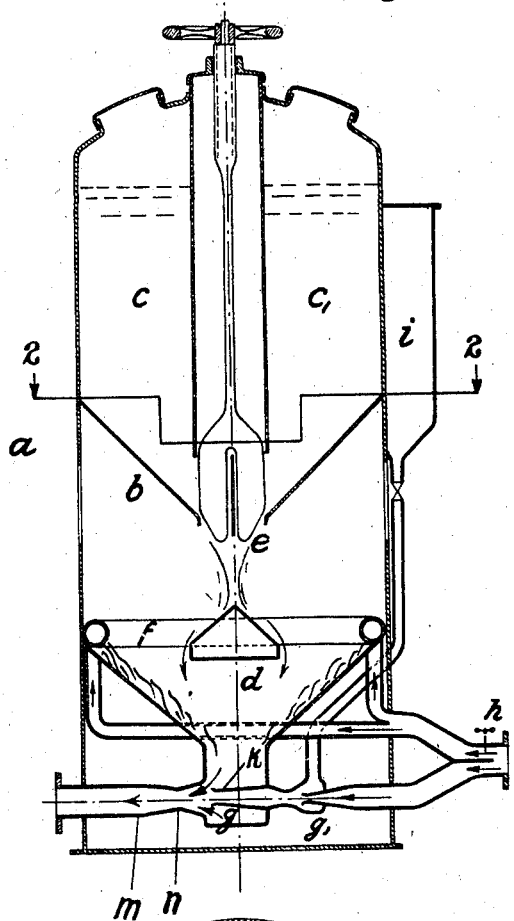
Figure 2:
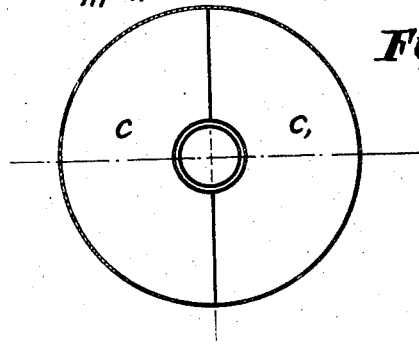

Figure 1 is a vertical sectional view of apparatus in accordance with my invention. Figure 2 is a horizontal sectional view taken on about the line 2—2 of Figure 1.

Referring to the drawing, $a$ is a cylindrical container or receptacle which is divided into an upper and lower compartment by an intermediate bottom $b$. The upper compartment $c$ serves for the reception and storage of pulverized or liquid chemicals and the lower compartment $d$ represents a mixing chamber in which the chemicals are dissolved in water, or added to a water stream. The upper compartment need not necessarily form an integral part of a cylindrical receptacle, as diagrammatically illustrated in the drawing by way of example, but may in the case of comparatively large apparatus or stationary plants form a separate part, for instance a separate receptacle for the reception of chemicals with supply pipes or the like leading to the mixing chamber.

The intermediate or false bottom $b$ is designed so that the chemicals may be allowed to drop through a controllable opening $e$ into the mixing chamber $d$ in definite quantities and at a controlled rate.

Within the mixing chamber are provided flushing devices $f$, which serve on the one hand for washing the dropping chemicals into the ejector $g$, and on the other hand for supplying a part of the quantity of water required for dissolving or mixing.

In order to convey the mixture of water and chemicals produced to the place where it is to be applied, the mixing chamber is provided with a suction apparatus $g$, which in the case illustrated is contemplated as an ejector. The ejector may comprise a nozzle $k$ connected to the same pipe line from which the water for flushing the chemicals is withdrawn. This nozzle $k$ preferably directs a jet of water into a receiver $m$ having a section $n$ of restricted cross-section. By a suitable hand operated valve $h$, the water supplied to the flushing device $f$ and to the nozzle $k$ may be adjusted so that the ejector $g$ draws off exactly as much solution or mixture as is produced in the mixing chamber.

For producing foam, either a plurality of these devices may be employed, or a single apparatus may be used. In the former arrangement, each hopper contains a different chemical. In the latter case, the chemicals are either uniformly mixed in the upper part or they are stored separately, as in chambers $c$ and $c_1$, but drop simultaneously into the mixing chamber and are there flushed away by the water.

According to the application of the chemicals, it is possible to delay the reaction of the chemicals considerably, so that the development of the foam does not take place in the mixing chamber.

It will be understood that this is an entirely new manner of generating or developing foam, as in this case different liquids are not produced which come into contact with each other and then generate carbonic acid gas and foam, but a mixture of chemicals is conveyed by an auxiliary medium into a stream of water where they can act upon one another and then produce carbonic acid and foam.

A further advantage of the improved method is that the foam stabilizer may be added to the mixture in liquid form, the supply of solution being held by a separate tank $i$. In this case the suction device is preferably designed as a two-stage ejector, the first stage drawing in the liquid foam developer and forcing it into the second stage where it draws in the mixture of acid and base and becomes intimately mixed therewith. The ejector $g_1$ may be constructed in a manner similar to the ejector $g$.

If only very cold water is available, the application of a steam injector is also possible. Designed as a subdivided ejector, the first injector sucks in cold water and passes it on to the flushing device. The two other stages suck in the foam developer and the acid-base mixture, as described above. Thus, even with very cold water, a hot mixture and consequently a quick chemical reaction is brought about owing to the addition of steam.

The use of an ejector is described by way of example only and it will be understood that it may be replaced by pumps.

Other modifications may be made without departing from the spirit and scope of the invention which must be understood to be limited by the state of the prior art only.

I claim as my invention:

1. An apparatus for producing foam for fire extinguishing purposes comprising a pair of hoppers, one being adapted to contain a foam developer and the other gas developing chemicals, and a two stage ejector below said hoppers, one stage being adapted to receive the foam developer and force it into the second stage, and the second stage being adapted to suck up the gas developing chemicals.

2. The method of producing fire extinguishing foam comprising flowing a stream of water under pressure through a two-stage injector, feeding a foam stabilizing agent into said stream through one stage of said ejector, and feeding a plurality of different chemicals adapted to react chemically in solution to produce foam into said stream through the other stage of said ejector.

3. The method of producing fire extinguishing foam comprising flowing a stream of water under pressure through a two-stage injector, feeding a foam stabilizing agent into said stream through the first stage of said ejector, and feeding a plurality of different chemicals adapted to react chemically in solution to produce foam into said stream through the second stage of said ejector.

HANS BURMEISTER.